July 5, 1938.  C. G. BONDESON  2,122,792
ELECTRIC CABLE CONNECTER
Original Filed May 25, 1932
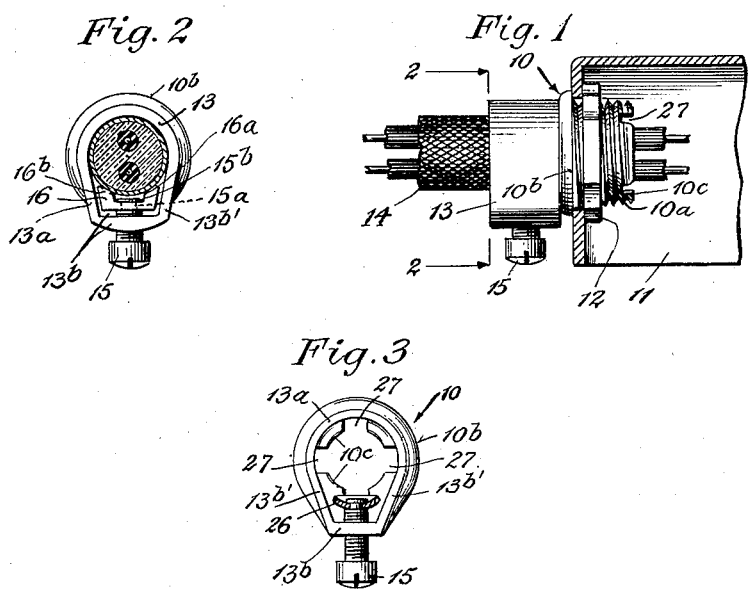
INVENTOR
Carl G. Bondeson,
BY 
ATTORNEY Patented July 5, 1938

2,122,792

UNITED STATES PATENT OFFICE 2,122,792

ELECTRIC CABLE CONNECTER

Carl G. Bondeson, Terryville, Conn., assignor to The Andrew Terry Company, Terryville, Conn., a corporation of Connecticut Original application May 25, 1932, Serial No. 613,452. Divided and this application July 15, 1936, Serial No. 90,645

3 Claims. (Cl. 285—6.5)

This invention relates to electrical fittings, and more particularly aims to provide an improved form of electric cable connecter especially valuable when applied to fittings for standard BX and for non-metallic cable and regular interior outlet boxes. In previous connecters for the purposes last mentioned, it has been usual to provide a connecter with one spring jaw on the body and a transversely arranged clamping screw. However, with this type of clamping arrangement, if the casting is thick or the metal pour is harder than usual, it is not possible rigidly to clamp the BX or other conduit or cable to the connecter.

The present invention provides an improved form of fitting which can be merely slid lengthwisely over the free end of the conduit or cable, then securely clamped to the cable, and then easily and quickly coupled to and anchored on any desired support, as an outlet box, and in any desired relation to such support, as that of partial insertion into the outlet box.

Other features and advantages will hereinafter appear.

In the drawing:

Figure 1 is a side elevation, partially in section, of a fitting according to the present invention; such embodiment being shown in fully assembled condition, and clamping an unarmored cable and mounted on an outlet box.

Fig. 2 is partially an end elevation and partially a transverse section, the view being taken on the line 2—2 of Figure 1, but with the outlet box omitted.

Fig. 3 is a view similar to Fig. 2, but with the conduit or cable not shown and illustrating a modified form of the invention.

The present application is a divisional one, based on my copending application Serial No. 613,452, filed May 25, 1932.

Referring first to Figs. 1 and 2, the connecter fitting of the present invention comprises a neck or nipple 10 adapted to extend through a hole in a side wall of an outlet box 11, on which the nipple is held in place by a nut 12. The inner end of the nipple has a male thread as indicated at 10a to match the thread in the nut 12. When the nut is tightened up the nipple is rigidly clamped on and partially extended within the box 11, the nipple being drawn up tight against the outer surface of the box by the abutment of an external annular shoulder 10b on the nipple.

The nipple 10, beyond its shoulder 10b, is formed as a specially shaped sleeve 13. The opening through this sleeve instead of being concentric is at one side of the sleeve of a semi-cylindrical shape as indicated at 13a in Fig. 2, so as there to conform substantially with the periphery of the sized cable with which the fitting is intended to be used, while the other part of the nipple is shaped to provide a substantially U-shaped channel 13b extending for a considerable extent beyond the axis of the cylindrical part of the nipple carrying the thread 10a, and so extending a considerable distance beyond the periphery of the cable 14 when the latter is in the nipple. This U-shaped channel is, at that one of its sides which marks its bottom, apertured and tapped to accommodate a clamping screw 15 which at its front end is provided with a reduced portion 15a forming a shoulder connection with a plate or shoe 16. This screw, as shown in Fig. 2, is headed-over at 15b to prevent the shoe from falling off, yet to permit relative rotating movement between the screw and the shoe.

Further, the U-shaped channel has two sides 13b' for guiding the shoe 16 in its movement toward and from the cable 14, and to prevent the shoe from turning with the screw 15. These sides 13b' preferably taper or converge slightly as they merge with the semi-circular wall 13a, vertically to align a concave face 16a of the shoe 16 with the semi-circular wall 13a when the shoe is drawn back, to facilitate sliding the cable 14 into the nipple, yet somewhat to free the shoe when advanced in the nipple, so as then to permit the shoe to rotate a limited extent and thereby allow pads or ribs 16b on the shoe to align with the spiral gap between convolutions of a flexible armored cable or to sink slightly within the relatively soft material of such an unarmored cable as that shown in Figs. 1 and 2 at 14. In either case, this means insures better holding of the cable and positive insurance against it being accidentally pulled out of place. The channel 13b positively aligns the shoe initially, to facilitate placing the fitting on the cable, yet allows the shoe to become free for limited rotation, thus to make the fitting self-accommodating for special types of cable or conduit.

By having the locating portion 13a of the sleeve semi-circular in shape, and by having the shoe 16 preferably provided with the concave face 16a, the cable or conduit is not deformed, even though the clamping screw 15 is tightened with considerable pressure. Due to the fact that the side walls 13b' of the sleeve prevent the shoe 16 from turning, the corners of the shoe are always so held as to prevent them wedging against said walls 13b'.

Referring now to the modification shown in Fig. 3, the parts designated by the numerals 10, 10b, 13a, 13b, 13b' and 15 correspond to the similarly numbered parts of Figs. 1 and 2. Here, however, instead of carrying a shoe like that shown at 16 in Figs. 1 and 2, the inner end of clamp screw 15 carries a washer 26 which is cupped and freely rotatable and slightly tiltable on the peened-over end of the screw. With this form of the invention, wherein the clamping member 26 is in the form of a substantially circular rotatable element like the dished washer shown, there is no tendency for such clamping member to jam within the walls 13b' of the sleeve, in fact no possibility of such jamming, and yet since said member 26 can tilt slightly on the end of the screw it can accommodate itself and automatically does accommodate itself to the surface of the cable with which it is used.

In both forms of the invention shown in the drawing, the inner end of the nipple is provided with an internal annular shoulder, to act as a stop and limit the movement of the conduit or cable inwardly of the nipple. As shown in Fig. 3, such annular shoulder, marked 10c', is an interrupted one, to provide peep holes 27'. A similar shoulder is indicated at 10c in Fig. 1; also an annular one interrupted by peep holes shown at 27 in Fig. 1.

Variations and modifications may be made within the scope of this invention, and portions of the improvements may be used without others.

I claim:

1. An outlet-box connecter for a conduit or cable, said connecter comprising a tubular body consisting of a substantially stirrup-shaped sleeve portion at one end and an immediately adjoining and externally threaded cylindrical nipple portion at its other end, the interior of said sleeve portion and the interior of said nipple portion providing a substantially straight-line passageway through the body from end to end through which a conduit or cable may be inserted into an outlet box to which the body is secured by a lock nut threaded on said nipple after the body has been inserted in a hole in such box, the interior of the sleeve portion being stirrup-shaped to provide a conduit or cable-fitting section at the bowl of the stirrup and to provide opposite such bowl a tapering U-shaped clearance channel, said nipple portion having an internal projection near its free end to limit insertion of the cable or conduit in said body, and the body having an external projection near the point of jointure of the nipple and sleeve portions to limit insertion of the body into an outlet box; and means for clamping the conduit or cable in said sleeve portion, said means including a screw passing through a wall of said channel at a point opposite said bowl and extended into the channel and toward substantially the center of said bowl, and a gripping element in the channel floatingly tiltingly mounted on the inner end of the screw.

2. An outlet box as in claim 1, in which said gripping element is provided with conduit or cable-gripping projections spaced across the same, and the sides of the channel and the ends of said element are shaped for coaction to hold said projections in line with said bowl during turning of the screw to move the element toward and away from the bowl.

3. An outlet-box connecter for a conduit or cable, said connecter comprising a tubular body consisting of a substantially stirrup-shaped sleeve portion at one end and an immediately adjoining cylindrical sleeve portion at its other end, the interior of said sleeve portions providing a passageway through the body from end to end through which a conduit or cable may be inserted into an outlet box to which the body is secured, the interior of the stirrup-shaped sleeve being so formed as to provide a conduit or cable fitting section at the bowl of the stirrup and to provide opposite such bowl a tapering U-shaped clearance channel, said cylindrical sleeve portion having an internal projection near its free end to limit insertion of the cable or conduit in said body, and the body having an external projection adjacent the jointure of the two sleeves to limit the insertion of the body into an outlet box; and means for clamping the conduit or cable in said stirrup-shaped sleeve portion including a screw passing through a wall of said channel at a point opposite said bowl and extended into the channel and toward substantially the center of said bowl, and a gripping element in the channel floatingly and tiltingly mounted on the inner end of the screw.

CARL G. BONDESON.